T. W. CASE.
ELECTRICAL DEVICE.
APPLICATION FILED JAN. 22, 1918.

1,318,196. Patented Oct. 7, 1919.

INVENTOR
Theodore W. Case
BY
Ewison & Thompson
ATTORNEY

UNITED STATES PATENT OFFICE.

THEODORE WILLARD CASE, OF SCIPIO, NEW YORK.

ELECTRICAL DEVICE.

1,318,196.   Specification of Letters Patent.   Patented Oct. 7, 1919.

Application filed January 22, 1918. Serial No. 213,228.

*To all whom it may concern:*

Be it known that I, THEODORE W. CASE, a citizen of the United States of America, and resident of Scipio, in the county of Cayuga, in the State of New York, have invented new and useful Improvements in Electrical Devices, of which the following, taken in connection with the accompanying drawings, is a full, clear, and exact description.

This invention relates to certain improvements in electrical devices adapted for many and various uses.

As illustrative of one such use, I will explain its adaptation to controlling or balancing aeroplanes, boats, ships, moving vehicles, and the like.

The device is exceptionally sensitive in detecting and automatically controlling tilting or tipping movement of any structure to which it may be applied, and in the present embodiment is gravity-actuated.

Various uses and advantages of the invention will appear from the following description, taken in connection with the accompanying drawings, in which—

In this specific illustration, the device embodies a vacuum bulb or vessel —A— in which are sealed a series of, in this instance four, electrodes —1—, —2—, —3— and —4—, respectively, as illustrated in the form of filaments.

Each filament is adapted to be heated in any suitable way and to a desired degree, and for this purpose the filaments are provided with a suitable source of electro-motive force, as batteries —5—, —6—, —7— and —8—, respectively, connected in series with resistances —9—, —10—, —11— and —12—, respectively, across the terminals of respective filaments to heat the filaments and control and vary the temperature of said filaments independently of each other.

An unheated electrode —13— is sealed within the vessel in such a way that in this illustration it is free to move or swing under the action of gravity as the vacuum vessel is tilted or moved from a predetermined normal position.

Figure 1:
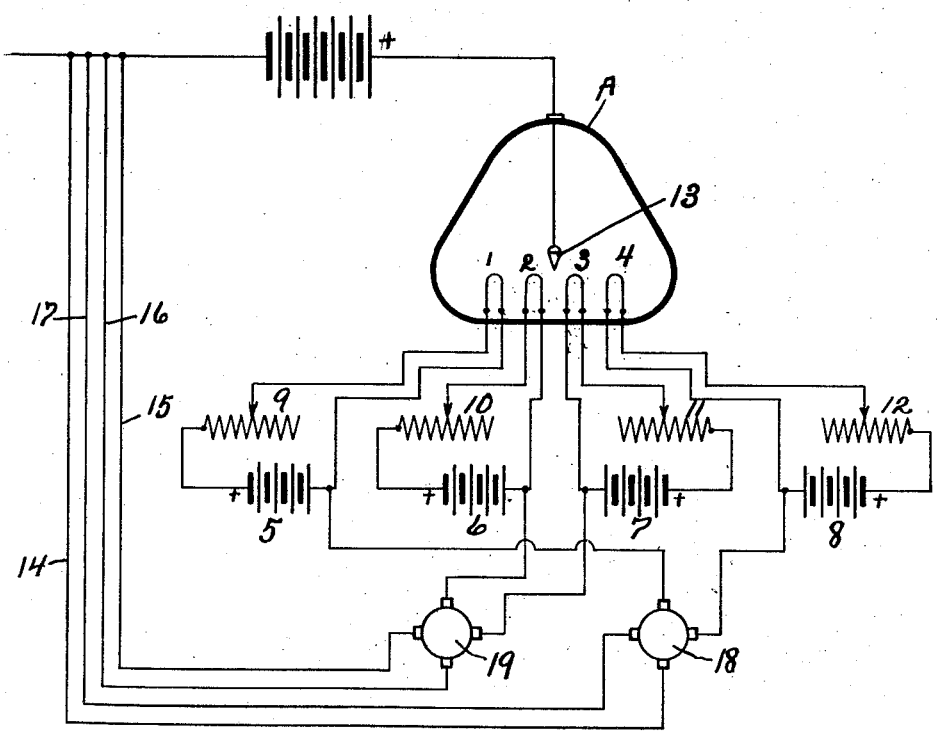
Figure 1 is a diagrammatic illustration of my invention.
Figure 2:
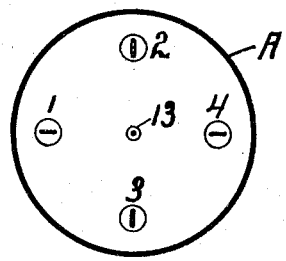
Fig. 2 is a diagrammatic top plan view of the vacuum vessel containing electrodes, as hereinafter described.

The filaments are arranged symmetrically and at equal distances from the unheated electrode under normal conditions, as shown in Fig. 2.

The movement of the unheated electrode under the action of gravity upon tilting of the vacuum vessel will cause said electrode to assume a position nearer one or more of the heated electrodes than the remaining electrodes within the vessel, so that a greater amount of current will flow from the unheated electrode to one or more of the heated electrodes rather than to others.

This variation in the current flowing from the unheated electrode to the heated electrode, dependent upon the position of the unheated electrode relatively to the heated ones may be utilized in various ways, as for example in automatically maintaining or returning a structure carrying the vacuum vessel to a predetermined normal or gravity position.

For this purpose, I have shown the unheated electrode as separately connected to each of the circuits for heating respective filaments, said connections constituting separate circuits through which current flowing between the unheated and heated electrodes will pass.

In these respective circuits may be positioned suitable operating devices, as motors, adapted for instance to be driven in one direction by increase of current flowing to certain of the filaments from the cold electrode when movement in one direction of the vessel causes the cold electrode to move nearer certain of the heated electrodes than others, and this motor operation may be utilized in any suitable way to mechanically return the structure to its normal or gravity position.

Tilting of the vacuum vessel in the opposite direction is arranged to effect a reverse operation of the motor by increase of current flowing through a circuit connecting the cold electrode to a different filament, whereby a reverse operation through the mechanical device, not necessary to herein illustrate or describe, may be effected.

As illustrative, the circuits —14— and —17— may both be utilized for driving the same motor —18— but adapted to operate it in opposite directions.

The direction of rotation of the armature of the motor will be determined by the circuit through which the greater amount of current is flowing, which determining factor will depend upon the position of the electrode —13— with respect to electrodes —1— and —4—.

In other words, when the electrode —13— is nearer the electrode —1— than electrode —4—, then the armature will rotate in one direction, and when the electrode —13— is nearer the electrode —4— than the electrode —1—, then the motor will be operated in the reverse direction.

The motor —19— operates in the same way as motor —18—, and is included in circuits —15— and —16— embodying filaments —2— and —3—, respectively.

The application of my invention as shown is purely illustrative of one use to which it may be applied.

Various other uses will be apparent and variations in use and changes and reversals in structure are deemed within the scope of the claims hereto appended.

What I claim is:

1. In combination, a vacuum vessel, a plurality of heatable electrodes sealed in said vessel and a cold electrode arranged for movement relatively to the heatable electrodes.

2. In combination, a vacuum vessel, a plurality of heatable electrodes sealed in said vessel and a cold electrode arranged for gravity movement relatively to the heatable electrodes.

3. In combination, a vacuum vessel, a plurality of electrodes sealed in said vessel, separate means for heating respective electrodes, a cold electrode arranged for movement relatively to the heated electrodes and circuits outside the vessel connecting the cold electrode to respective heated electrodes.

4. In combination, a vacuum vessel, a plurality of electrodes, sealed in said vessel, a battery in series with each of said electrodes for heating the same, a cold electrode within the vessel, and normally positioned equi-distant from each of the heated electrodes and movable relatively to said heated electrodes to vary the current flowing to respective heated electrodes and circuits outside the vessel connecting the cold electrode to each of the heated electrodes.

5. In combination, a vacuum vessel, a plurality of electrodes sealed in said vessel, a battery in series with each of said electrodes for heating the same, a variable resistance in series with each battery, a cold electrode within the vessel and normally positioned equi-distant from each of the heated electrodes and movable relatively to said heated electrodes to vary the current flowing to respective heated electrodes, and circuits outside the vessel connecting the cold electrode to each of the heated electrodes.

6. In combination, a vessel, a heated electrode within the vessel, a cold electrode within the vessel, one of said electrodes movable relatively to the other to vary the relative proximity of the electrodes.

In witness whereof I have hereunto set my hand this 4th day of January, 1918.

THEODORE WILLARD CASE.

Witnesses:
JOHN M. BRAINARD,
E. M. STEVENSON.